Feb. 6, 1934.  P. R. ARONSON  1,945,673
APPARATUS FOR ASSEMBLING ELECTRIC CELLS
Filed Nov. 14, 1930

INVENTOR:
Peter R. Aronson,
BY Byrne Townsend & Potter,
ATTORNEYS.

Patented Feb. 6, 1934

1,945,673

UNITED STATES PATENT OFFICE 1,945,673

APPARATUS FOR ASSEMBLING ELECTRIC CELLS

Peter R. Aronson, Lakewood, Ohio, assignor to National Carbon Company, Inc., a corporation of New York Application November 14, 1930
Serial No. 495,744

4 Claims. (Cl. 136—1)

This invention relates to primary electric cells and particularly to electric cells of the type having a caustic alkali electrolyte and zinc and carbon electrodes and in which the electrolyte-forming material is cast around the electrodes so that the electrodes are protected during shipment and the cell requires only the addition of water preparatory to being placed in service.

An object of my invention is to provide a reliable yet simple method and apparatus for casting the electrolyte-forming material around the electrodes or elsewhere in a galvanic cell. Other objects of my invention will be evident from the following specification having reference to the accompanying drawing in which.

Figure 1:
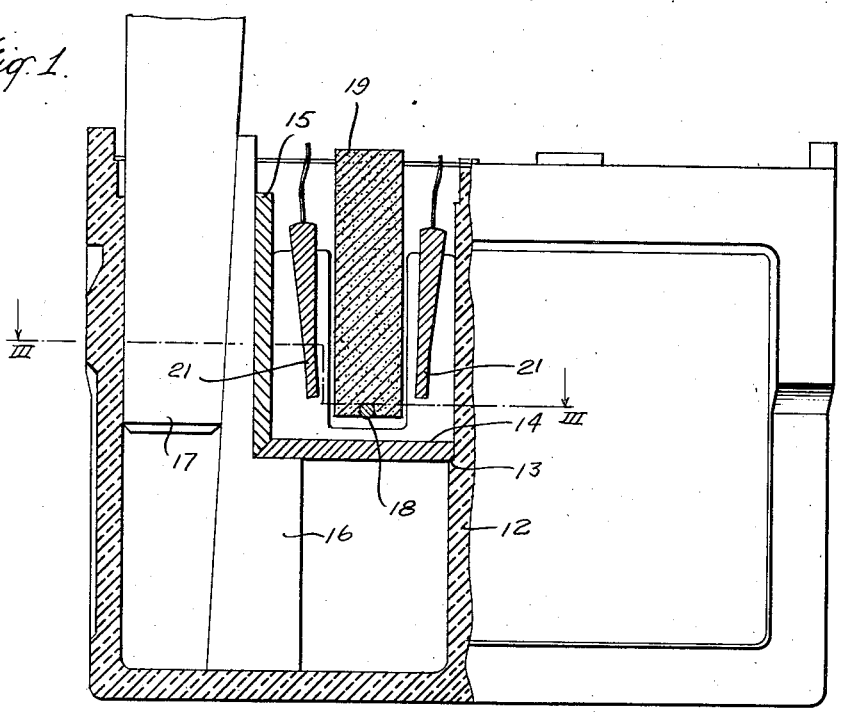
Fig. 1 is a view, partially in cross section, of a cell with an apparatus illustrating one embodiment of my invention in place for casting.
Figure 2:
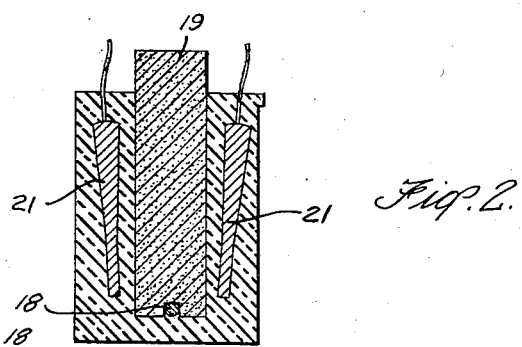
Fig. 2 is a similar section of a portion of the cell after the electrolyte-forming material has been cast around the electrode and the mould removed.
Figure 3:
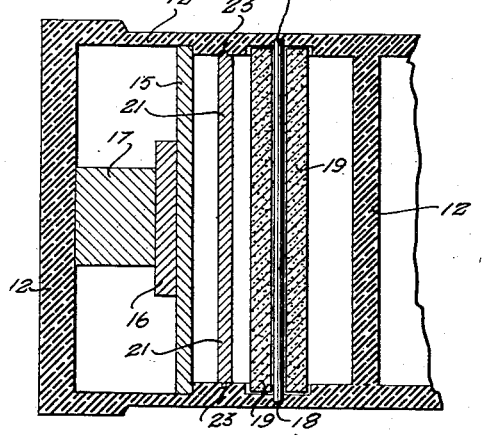
Fig. 3 is a section on the line III—III of Fig. 1.

In the drawing I have shown my invention applied to a battery of two cells, only one cell being shown in section. The cell illustrated has a carbon electrode and a pair of zinc electrodes and the electrolyte-forming material may be a hydrated caustic substance, such as is formed by adding about 45% by weight of water to sodium hydroxide. A mixture of sodium hydroxide and water in this proportion evolves a large quantity of heat and forms a liquid which, upon cooling, hardens to a dry solid having the approximate formula $NaOH \cdot H_2O$. The invention is however also adapted for use with a battery using other types of electrodes and other electrolyte forming materials. The container 12 for the cell is provided with a shoulder 13 on one wall thereof below the electrodes. While I do not limit myself thereto, I prefer to have this shoulder formed on the wall parallel to the length of the electrodes and nearest adjacent thereto. The mould comprises a bottom member 14 and a side member 15. These members, with portions of three sides of the container 12, form the mould for electrolyte-forming material. In order to support the members 14 and 15 during the casting of the electrolyte-forming material I use suitable supports such as members 16 and 17. Member 16 is chair-shaped in cross section and is slightly tapered in the back. Member 17 is correspondingly tapered. Member 16 should extend about half the width of the cell while member 17 may be narrower, although I may use other lengths. Thus members 16 and 17 may even extend the entire width of the cell.

In casting the electrolyte forming material around the electrode of a primary cell the following method is employed. The chair member 16 is inserted in the cell and the bottom member 14 of the mould rests upon the seat of the chair and the shoulder 13 in one wall of the cell. The side member 15 of the mould is then inserted against the back of the chair. I prefer that the members 14 and 15 shall be beveled to engage each other although this is not necessary. After members 14 and 15 of the mould are in position, wedge member 17 is inserted, locking the mould in place. A rod 18, serving as a support for the carbon electrode 19, is inserted and is supported at the ends by a groove in the cell wall. The carbon electrode 19 is then placed in position to engage the rod 18. Either before or after the carbon electrode is inserted the zinc electrodes 21 are inserted, these electrodes being supported by grooves 23 in the cell wall. The carbon electrode is held in position at the top by any suitable clamp or holder. The cell assembly is now in condition for receiving the liquid electrolyte-forming material. After the electrolyte-forming material has set, the clamp is removed and the wedge member 17 is pulled out. This permits the chair member 16 to be drawn away from the electrodes whereby it becomes disengaged from the mould members 14 and 15. The chair member 16 is then removed from the cell and the mould members 14 and 15 are quickly disengaged from the solidified electrolyte-forming material.

I claim:

1. A mould device for casting electrolyte-forming material in a galvanic cell having a shoulder on one wall of the cell, comprising a bottom member adapted to rest on said shoulder and to engage the two sides of the container adjacent the wall having the shoulder, a side member engaging said bottom member and two walls of the cell container and locking means engaging at least one of said mould forming members and a wall of said container.

2. A mould device for casting electrolyte-forming material in a galvanic cell having a shoulder on one wall of the cell, comprising a bottom member adapted to rest on said shoulder and to engage the two sides of the container adjacent the wall having the shoulder, a side member engaging said bottom member and two walls of the cell container and locking means engaging at least one of said mould forming members and a wall of said container, said locking means comprising a member of chair-shaped cross section and a member extending between said last mentioned member and a wall of the cell.

3. A mould device for casting electrolyte-forming material in a galvanic cell having a shoulder on one wall of the cell, comprising a bottom member adapted to rest on said shoulder and to engage the two sides of the container adjacent the wall having the shoulder, a side member engaging said bottom member and two walls of the cell container and locking means engaging at least one of said mold forming members and a wall of said container, said locking means comprising a member of chair-shaped cross section and a wedge shaped member engaging said last mentioned member and a wall of the cell.

4. A mould device for casting electrolyte-forming material in a galvanic cell comprising members forming the bottom and at least one side of the mold and adapted to engage the wall of the cell container to form the remaining sides, a member having a chair-shaped cross section engaging said mould forming members and a wedge shaped member engaging said member of chair-shaped cross section and a wall of the said container.

PETER R. ARONSON.